Figure 1:
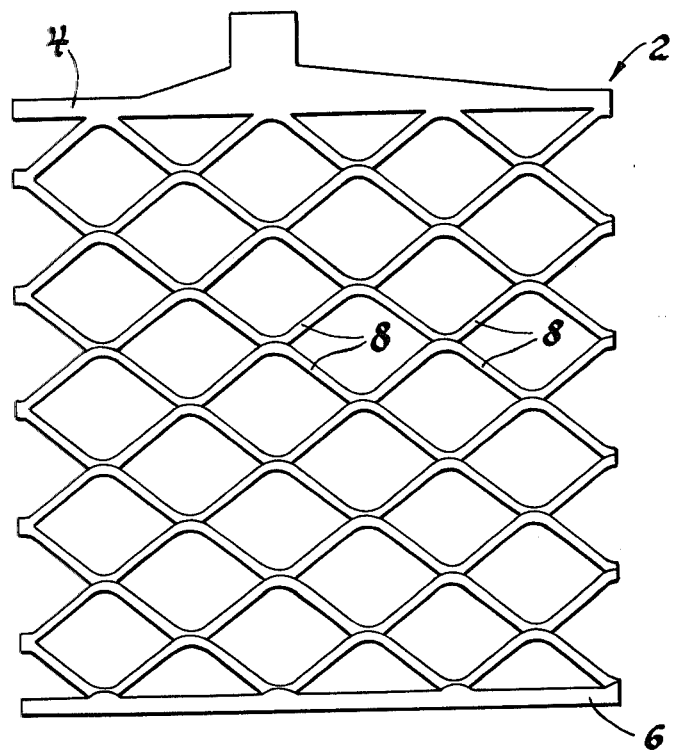

United States Patent [19]

Matter

[11] 4,358,518
[45] Nov. 9, 1982

[54] WROUGHT LEAD-CALCIUM-STRONTIUM-TIN (±BARIUM) ALLOY FOR BATTERY COMPONENTS

[75] Inventor: Robert C. Matter, Anderson, Ind.

[73] Assignee: General Motors Corporation, Detroit, Mich.

[21] Appl. No.: 240,070

[22] Filed: Mar. 3, 1981

Related U.S. Application Data

[63] Continuation-in-part of Ser. No. 153,333, May 27, 1980, abandoned.

[51] Int. Cl.³ .............................................. H01M 4/68
[52] U.S. Cl. .................................... 429/245; 420/565
[58] Field of Search ................. 429/178, 245; 75/166, 75/167

[56] References Cited

U.S. PATENT DOCUMENTS

| | | | |
|---|---|---|---|
| 2,013,487 | 9/1935 | Canfield et al. | 75/166 |
| 2,170,650 | 8/1939 | Bouton et al. | 75/167 |
| 3,706,605 | 12/1972 | Newbury et al. | 75/166 D |
| 4,137,378 | 1/1979 | Nees et al. | 429/245 |
| 4,170,470 | 10/1979 | Marshall et al. | 75/166 D |

OTHER PUBLICATIONS

Bagshaw, *Journal of Power Sources*, 2(1977/78) 337-350.

*Primary Examiner*—Donald L. Walton
*Attorney, Agent, or Firm*—Lawrence B. Plant

[57] ABSTRACT

A work hardenable Pb-Ca-Sr-Sn alloy having anti-recrystallization stability at temperatures below about 66° C. The alloy comprises by weight: 0.03% to 0.04% calcium; 0.15% to 0.4% strontium; 0.15% to 0.9% tin; 0% to 0.1% barium; and the balance principally lead. The alloy is useful in the manufacture of cold-worked Pb-acid storage battery components and particularly grids made by the expanded, wrought lead strip process.

5 Claims, 3 Drawing Figures

# WROUGHT LEAD-CALCIUM-STRONTIUM-TIN (±BARIUM) ALLOY FOR BATTERY COMPONENTS

BACKGROUND OF THE INVENTION

This is a continuation-in-part of U.S. patent application Ser. No. 153,333 filed on May 27, 1980, now abandoned, in the name of Robert C. Matter and assigned to the assignee of this application.

This invention relates to lead-acid storage batteries of the maintenance-free type which employ antimony-free lead alloys therein to reduce water consumption and battery self discharge. More specifically, this invention relates to wrought lead-calcium-strontium-tin alloys (with or without barium) for use: in the grids used to support the electro-chemically active material of such batteries, and in other lead components used in the battery.

In recent years the battery industry has moved toward the "maintenance free" SLI automobile battery which has reduced gasing tendencies and an ability to retain most of its original electrolyte throughout its normal useful life. A key element in the manufacture of such batteries is the elimination of antimony from the battery components and particularly from the grid used to support the batteries electro-chemically active materials. Some manufacturers have abandoned the traditional approach of casting these grids and begun forming the grids by expanding wrought lead alloy strip such as, for example, by the process disclosed in Daniels et al U.S. Pat. No. 3,853,626. Such expansion processes have heretofore used such wrought lead-calcium-tin alloys as are disclosed in Prengaman U.S. Pat. No. 3,953,244 and my copending United States patent application U.S. Ser. No. 940,993 filed on Sept. 11, 1978 now U.S. Pat. No. 4,228,580 and assigned to the assignee of the present invention. Other manufacturers have continued to cast the grids using lead-calcium-tin alloys. Other castable alloys including various combinations of lead, calcium, strontium, tin and barium have been proposed. One such alloy is disclosed in Nees et al U.S. Pat. No. 4,137,378.

While such other alloys offer a number of casting advantages (e.g. fluidity and rapid age hardenability) they are not satisfactory for the manufacture of grids by the expanded wrought strip method or for other cold-worked battery components. In this regard, these other alloys recrystallize after cold working such that their tensile strength can fall to as low as about 20,685 kPa after only a few months standing at room temperature. Retained tensile strengths in excess of about 34,500 kPa are most desirable for such grids. In this regard, loss of tensile strength in battery grids promotes early failure of the batteries due to the breaking of grid wires incident to the vibration and shock automotive batteries normally experience in service. Moreover, weakened, recrystallized grids have less resistance to plate growth and are often susceptible to catastrophic intergrannular corrosive attack. The problem of wrought alloy selection is particularly acute in the warmer climates where the battery is consistently exposed to elevated, under-the-hood temperatures which promote recrystallization and loss of strength of alloys which would otherwise be stable at room temperature.

Other battery components (e.g. plate straps, connectors, terminals, etc.) are often cold-worked in the process of assembling the battery and accordingly must have acceptable metallurgical properties not only for the cold-working operation itself, but also in order to complete the mission that part must perform in the battery. Cold-worked terminals, for example, need to be ductile for readily mechanically (i.e. upsetting) attaching them to the case, and once attached need to retain their strength lest they loosen from the case causing electrolyte leakage and perchance separation of the terminal from the container. Cast lead-antimony alloys (i.e. 2%-6% Sb) commonly used for these parts have relatively coarse dendritic cast structures which age harden rapidly, yielding high strengths but poor ductility, making these alloys difficult to use where extensive cold deformation is required. Moreover at room temperature, cold-worked antimony alloys tend to soften with time due to a breakup of the antimony strengthening phase causing tensile strengths to fall rapidly (i.e. from about 48,300 kPa to about 31,000 kPa). Because of this loss of strength, the parts must be over-designed for cold working to compensate for the loss of strength and inherently poor ductility of these alloys. Ideally a lead battery alloy for cold working would be ductile in the as-cast condition and be capable of being worked over a broad range of reduction percentages and have a retained tensile strength of at least about 34,500 kPa after aging at both room temperature or at temperatures up to about 66° C. for at least six (6) months.

Accordingly, it is an object of the present invention to provide a ductile, lead-calcium-strontium-tin alloy particularly suitable for the manufacture of cold-worked lead-acid storage battery components which components have both room temperature and high temperature (i.e. up to about 66° C.) anti-recrystallization stability, as well as excellent corrosion resistance. It is a further object of the present invention to provide a wrought, expanded, lead-acid storage battery grid consisting essentially of lead, calcium, strontium and tin (with or without barium) which grid has both room temperature and high temperature (i.e. up to about 66° C.) tensile strengths in excess of about 34,500 kPa, and excellent corrosion resistance.

Figure 2:
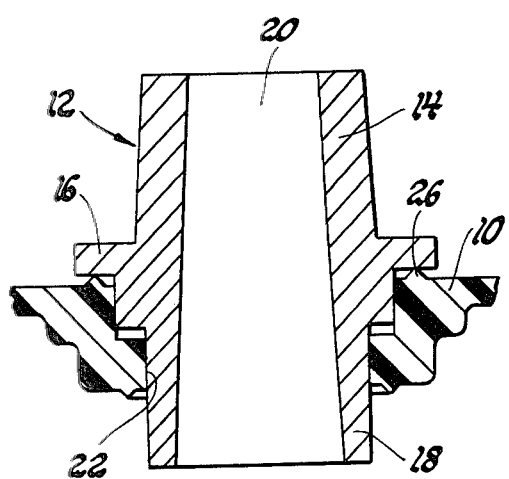
Figure 3:
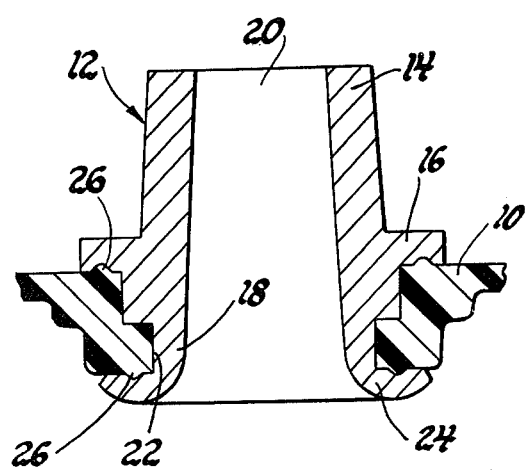

These and other objects and advantages of the present invention will become more readily apparent from the detailed description thereof which follows:

FIG. 1 illustrates an expanded, wrought, Pb-Ca-Sr-Sn alloy battery grid according to the present invention; and FIGS. 2 and 3 respectively illustrate, in side section, a Pb-Ca-Sr-Sn battery terminal before and after cold working to secure the terminal to a battery cover.

THE INVENTION

The present invention comprehends ductile (as-cast) lead-calcium-strontium-tin alloys (with or without barium) which, when work hardened (e.g. by a rolling mill), do not recrystallize, but rather exhibit room temperature and high temperature (i.e. up to about 66° C.) tensile strengths in excess of about 34,500 kPa after six months following rolling. More specifically this invention comprehends wrought alloys having the aforesaid anti-recrystallization stability as well as other properties suitable for lead-acid storage battery components and consist essentially of (by weight):

calcium: about 0.03%–0.04%
strontium: about 0.15%–0.4%
tin: about 0.15%–0.9%
barium: about 0–0.1% lead: remainder (i.e. including normal impurities).

Well known casting aids, such as small amounts (i.e. up to about 0.06%) of aluminum, may be used effectively without disturbing the alloys's ductility or strength stability.

The wrought alloys of this invention have demonstrated high levels of retained (i.e. after six months) tensile strength, excellent corrosion resistance, and excellent weldability to other lead parts inside the battery. Long term (i.e. aged more than 137 days between rolling and testing) stress rupture values in excess of 2,000 hours (i.e. at 20,685 kPa), and room temperature tensile strengths around 68,950 kPa are possible with tin levels in the range of about 0.65% to about 0.9% by weight. However, when the strontium levels are below 0.3% at these higher tin levels, the high temperature tensile strength (i.e. after six months) is low (i.e. about 24,132 kPa), and grids made therefrom are more susceptible to corrosion in the battery than the lower tin content alloys at the same strontium level. To combat this corrosion susceptibility and high temperature tensile strength loss, about 0.025% to about 0.07% barium is added to the high tin alloys whose strontium level is below 0.3%. Adding barium in excess of about 0.07% to such alloys is seen to reduce the long term high temperature tensile strength to unacceptable levels. Barium, however, may be used at higher levels (e.g. 0.1%) with the lower tin alloys, but no particular benefit is apparent from such use. In the presence of the 0.025%-0.07% barium, the six month high temperature tensile strength levels were maintained above about 34,500 kPa range for the high tin-low strontium content alloys. As a practical matter, the lower tin alloys are preferred for cost reasons alone, as the cost of tin dictates that its use be minimized wherever possible.

While the precise metallurgical mechanism is not understood, the relatively low calcium concentration appears to be responsible for imparting the anti-recrystallization properties and stable tensile strengths to strontium-tin alloyed lead. Moreover such low calcium levels do not result in excessive oxidation of the alloy. As a result, these low calcium content alloys have the further advantage of being more readily weldable than alloys having higher calcium contents. Hence grids made from alloys in accordance with the present invention can be readily welded to other grids as by the well known cast-on-strap process, and other battery small parts (e.g. plate straps) can be readily resistance welded to other parts (e.g. plate straps) by such processes as, for example, are described in Matter U.S. Pat. No. 3,947,290.

The preferred compositions of the Pb-Ca-Sr-Sn (±Ba) alloys of the present invention will depend on which property is considered more important and hence sought to be optimized. The most effective alloys for developing stable room temperature tensile strengths in excess of 51,700 kilopascals (kPa) are seen to be those containing: about 0.03%-0.04% calcium; about 0.15%-0.25% strontium; about 0.3%-0.8% tin; from 0 to about 0.1% barium; and the balance principally lead—with the barium varying from about 0.25%—about 0.07% when the tin content exceeds about 0.65%. Alloys having stable tensile strengths in excess of about 41,370 at temperatures up to 66° C. as well as excellent corrosion resistance and weldability are seen to be best developed with alloys containing: about 0.03%-0.04% calcium; about 0.15%-0.35% strontium; about 0.15%-0.35% tin; and the balance principally lead.

The aforesaid preferred concentrations were determined on the basis of alloys prepared according to a cold working schedule in which a 1.91 cm thick billet was passed in one direction through a series of seven rolls wherein each roll reduced the thickness of the billet by 35% per roll. Tensile strengths were measured after the worked alloys had aged six (6) months at room temperature and at 66° C. respectively. Corrosion was evaluated subjectively following completion of a standardized accelerated corrosion test. The results of these tests are set forth in the Table.

TABLE

| Sample | Alloy | Corrosion | Tensile Str. (kPa) 66° C. | Tensile Str. (kPa) RT | Elongation 66° C. | Elongation RT |
|---|---|---|---|---|---|---|
| 1 | .04 Ca— .04 Sr— .25 Sn | Slight | 25,684 | 30,924 | 19% | 17% |
| 2 | .04 Ca— .07 Sr— .25 Sn | Very Slight | 24,201 | 43,576 | 25% | 10.1% |
| 3 | .03 Ca— .20 Sr— .8 Sn | Severe | 24,477 | 71,019 | 20% | 7.5% |
| 4 | .20 Sr— 1.10 Sn— .15 Sb | — | Too soft | Too soft | Too soft | Too soft |
| 5 | .03 Ca— .2 Sr— .25 Sn | Very Slight | 41,370 | 51,871 | 17.5% | 19.5% |
| 6 | .03 Ca— .3 Sr— .8 Sn | None | 43,473 | 47,355 | 22% | 22.5% |
| 7 | .03 Ca— .3 Sr— .25 Sn | Very Slight | 42,515 | 46,134 | 21.5% | 22.6% |
| 8 | .03 Ca— .2 Sr— .8 Sn— .1 Ba | None | 27,787 | 59,221 | 30.5% | 16% |
| 9 | .03 Ca— .2 Sr — .8 Sn— .2 Ba | None | 26,394 | 49,348 | 32.5% | 15.5% |
| 10 | .03 Ca— .2 Sr— .8 Sn— .05 Ba | None | 37,316 | 52,574 | 22.5% | 16.5% |
| 11 | .03 Ca— .07 Sr— .25 Sn— 0.1 Ba | Very Slight | 24,925 | 47,948 | 36.5% | 16% |
| 12 | .03 Ca— .2 Sr— .25 Sn— 0.1 Ba | Very Slight | 40,225 | 54,705 | 16% | 18% |
| 13 | .08 Ca— .02 Sr— .17 Sn | — | 24,132 | 47,575 | 20.3% | 14% |
| 14 | .19 Sr— 1.1 Sn | — | 22,064 | 35,164 | 36% | 16% |
| 15 | .11 Sr— .67 Sn | — | 22,064 | 28,959 | 40% | — |
| 16 | .03 Ca— .25 Sr .25 Sn | — | 42,404 | 60,676 | 34.5% | 23.3% |
| 17 | .03 Ca— .25 Sr .25 Sn | — | 43,439 | 57,573 | 35% | 26.5% |

The nature of the cold working or rolling schedule is not seen to be particularly critical in achieving the results observed. In this regard, several different rolling schedules were tested to determine what, if any, effect they might have on the results observed. The alloys of the present invention demonstrated no significant sensitivity to property variations from one rolling schedule to the next except for slight reductions in stress rupture values as cold working severity increased. The varying work schedules tested included constant percentage reduction rolling schedules to wit: reducing a 3.05 cm thick billet to a 0.11 cm thick strip by passing it through six rolls wherein each roll in succession reduced the thickness of the billet by 45%; reducing a 1.4cm thick billet to a 0.11 cm thick strip by passing it through six rolls wherein each roll in succession reduced the thickness of the billet by 35% reducing a 0.6 cm thick billet to a 0.11 cm thick strip by passing it through six rolls wherein each roll in succession reduced the thickness of the billet by 25%; and reducing a 0.28 cm thick billet to a 0.11 cm thick strip by passing it through six rolls wherein each roll in succession reduced the thickness of the billet by 15%. The rolling schedule tests also included constant thickness reductions to wit: reducing a 3.05 cm thick billet to a 0.11 cm thick strip by passing it through nine rolls wherein each roll in succession reduced the thickness of the billet by 0.35 cm per roll; reducing a 2.0 cm billet to a 0.11 cm thick strip by passing it through nine rolls wherein each roll in succession reduced the thickness of the billet by 0.21 cm per roll; reducing a 1.4 cm thick billet to a 0.11 cm thick strip by passing it through nine rolls wherein each roll in succession reduced the thickness of the billet by 0.14 cm per roll; and reducing a 0.6 cm thick billet to a 0.11 cm thick strip by passing it through nine rolls wherein each roll in succession reduced the thickness of the billet by 0.56 cm per roll.

The drawings illustrate two battery components which are cold-worked in the process of manufacturing a battery and which require stable strengths throughout the useful life of the battery.

FIG. 1 depicts a typical Pb-acid storage battery grid 2 expanded from a strip of wrought antimony-free lead alloy. The grid 2 includes an upper current collecting border 4, a lower plate-supporting border 6 and a plurality of interconnected grid wires 8 extending therebetween for receiving and retaining the plate's active material.

FIGS. 2 and 3 depict a portion of a battery cover 10 sectioned through a terminal insert 12 before (i.e. FIG. 2) and after (i.e. FIG. 3) the insert 12 is attached to the cover 10 by cold upsetting the underside thereof. The insert 12 includes an annular tapered tower 14, a flange 16 and a depending skirt 18. During assembly of the insert 12 to the cover 10 the skirt 18 is inserted into an aperture 22 in the cover 10 (see FIG. 2) and thereafter spin-riveted over (see FIG. 3) so as to pull the flange 16 down tight against the surface of the cover 10. The riveting cold works the skirt 18 causing it to flare outwardly as at 24 and tightly engage the underside of the cover 10 around the mouth of the aperture 22. Annular bosses 26 circumscribe the aperture 22 on the top and bottom surfaces of the cover 10 and bite into the flange 16 and flare 24 as illustrated to enhance sealing. The cold-worked flare 24 must retain its strength throughout the life of the battery to prevent loosening of the insert 12 which can result in electrolyte leakage around the insert 12 or separation of the terminal from the battery. As strength retention is not critically dependent on the amount of cold work involved, the riveting operation is not particularly critical in the sense of having to carefully control the nature of the cold work effected on the skirt 18 in forming the flare 24. In fact, the ductility of parts made in accordance with the present invention actually improves the riveting operation itself. When the cover 10 is assembled to the container, an opening 20 in the insert 12 receives an upstanding post from the battery's innards (not shown) and is welded thereto to form the battery terminal.

While this invention has been disclosed in terms of specific embodiments thereof it is not intended to be limited thereto, but rather only to the extent set forth hereafter in the claims which follow.

The embodiments of the invention in which an exclusive property or privilege is claimed are defined as follows:

1. A lead-acid storage battery component comprising a corrosion-resistant, lead based alloy having anti-recrystallization stability at temperatures up to at least 66° C. for periods of at least six months, said alloy consisting essentially of about 0.03 to about 0.04 weight percent calcium, about 0.15 to about 0.4 weight percent strontium, about 0.15 to about 0.9 weight percent tin, and lead, said alloy also containing barium in a concentration ranging from about 0.025 to about 0.07 weight percent when said alloy contains less than 0.3 percent by weight strontium and more than about 0.65 weight percent tin.

2. A lead-acid storage battery component comprising a cold-worked, corrosion-resistant, lead alloy having anti-recrystallization stability at temperatures below about 66° C. for periods of at least six months, said alloy consisting essentially of about 0.03 to about 0.04 weight percent calcium, about 0.15 to about 0.35 weight percent strontium, about 0.15 to about 0.35 weight percent tin and the balance principally lead.

3. A lead-acid storage battery component comprising a cold-worked, corrosion-resistant, lead alloy having anti-recrystallization stability at temperatures below about 66° C. for periods of at least six months, said alloy consisting essentially of about 0.03 to about 0.04 weight percent calcium, about 0.15 to less than 0.03 weight percent strontium, about 0.65 to about 0.9 weight percent tin, about 0.025 to about 0.07 weight percent barium and the balance principally lead.

4. A lead-acid storage battery component comprising a cold-worked, corrosion-resistant, lead alloy having anti-recrystallization stability at temperatures below about 66° C. for periods of at least six months, said alloy consisting essentially of about 0.03 to about 0.04 weight percent calcium, at least 0.3 to about 0.4 weight percent strontium about 0.65 to about 0.9 weight percent tin, and the balance principally lead.

5. A lead-acid storage battery component comprising a cold-worked, corrosion-resistant, lead alloy having anti-recrystallization stability at temperatures below about 66° C. for periods of at least six months, said alloy consisting essentially of about 0.03 to about 0.04 weight percent calcium, at least 0.3 to about 0.4 weight percent strontium, about 0.15 to about 0.35 weight percent tin, and the balance principally lead.

* * * * *

UNITED STATES PATENT AND TRADEMARK OFFICE
CERTIFICATE OF CORRECTION

PATENT NO. : 4,358,518
DATED : November 9, 1982
INVENTOR(S) : Robert C. Matter

It is certified that error appears in the above—identified patent and that said Letters Patent is hereby corrected as shown below:

Column 6, Claim 3, line 43, "0.03" should read -- 0.3 --.

Signed and Sealed this

Eighth Day of February 1983

[SEAL]

Attest:

Attesting Officer

GERALD J. MOSSINGHOFF
Commissioner of Patents and Trademarks